United States Patent
Amici-Kroutilova et al.

(10) Patent No.: US 10,017,599 B2
(45) Date of Patent: Jul. 10, 2018

(54) POLYISOCYANATE POLYADDITION POLYOL MANUFACTURING PROCESS USING STABILIZERS

(71) Applicant: DOW GLOBAL TECHNOLOGIES LLC, Midland, MI (US)

(72) Inventors: Irena Amici-Kroutilova, Waedenswil (CH); Paul Cookson, Samstagern (CH); Ricco Borella, Schindellegi (CH); Daniel Hoenhener, Dubendorf (CH); Francois Casati, Pfaffikon (CH)

(73) Assignee: Dow Global Technologies LLC, Midland, MI (US)

(*) Notice: Subject to any disclaimer, the term of this patent is extended or adjusted under 35 U.S.C. 154(b) by 25 days.

(21) Appl. No.: 14/916,987

(22) PCT Filed: Sep. 11, 2014

(86) PCT No.: PCT/US2014/055262
§ 371 (c)(1),
(2) Date: Mar. 4, 2016

(87) PCT Pub. No.: WO2015/038825
PCT Pub. Date: Mar. 19, 2015

(65) Prior Publication Data
US 2016/0194431 A1 Jul. 7, 2016

Related U.S. Application Data

(60) Provisional application No. 61/877,287, filed on Sep. 13, 2013.

(51) Int. Cl.
| | |
|---|---|
| C08G 18/08 | (2006.01) |
| C08G 18/76 | (2006.01) |
| C08G 18/09 | (2006.01) |
| C08G 18/18 | (2006.01) |
| C08G 18/22 | (2006.01) |
| C08G 18/24 | (2006.01) |
| C08G 18/28 | (2006.01) |
| C08G 18/32 | (2006.01) |
| C08G 18/40 | (2006.01) |
| C08G 101/00 | (2006.01) |

(52) U.S. Cl.
CPC ....... *C08G 18/0876* (2013.01); *C08G 18/092* (2013.01); *C08G 18/1875* (2013.01); *C08G 18/222* (2013.01); *C08G 18/225* (2013.01); *C08G 18/244* (2013.01); *C08G 18/283* (2013.01); *C08G 18/3203* (2013.01); *C08G 18/3281* (2013.01); *C08G 18/409* (2013.01); *C08G 18/7621* (2013.01); *C08G 2101/005* (2013.01); *C08G 2101/0008* (2013.01); *C08G 2101/0083* (2013.01)

(58) Field of Classification Search
CPC .............. C08G 18/0876; C08G 18/092; C08G 18/1875; C08G 18/222; C08G 18/225; C08G 18/244; C08G 18/283; C08G 18/3203; C08G 18/3281; C08G 18/409; C08G 18/7621; C08G 2101/0008; C08G 2101/005; C08G 2101/0083
See application file for complete search history.

(56) References Cited

U.S. PATENT DOCUMENTS

| | | | |
|---|---|---|---|
| 4,093,569 A | 6/1978 | Reischl | |
| 4,305,857 A | 12/1981 | Reischl | |
| 4,310,448 A | 6/1982 | Reischl | |
| 4,310,449 A | 6/1982 | Reischl | |
| 4,374,209 A | 2/1983 | Rowlands | |
| 4,452,923 A | 6/1984 | Carroll | |
| 4,518,778 A * | 5/1985 | Cuscurida | C08G 18/409 252/182.26 |
| 5,157,074 A | 10/1992 | Metzger | |
| 6,506,813 B1 | 1/2003 | Parfondry | |
| 7,947,756 B2 | 5/2011 | Andries | |
| 8,318,823 B2 | 11/2012 | Triouleyre | |
| 2007/0238796 A1 | 10/2007 | Lovenich | |
| 2008/0167394 A1* | 7/2008 | Haas | C08G 18/409 521/164 |
| 2008/0300338 A1 | 12/2008 | Wagner | |
| 2010/0105833 A1 | 4/2010 | KellerW | |

FOREIGN PATENT DOCUMENTS

| | | |
|---|---|---|
| EP | 56581 A | 7/1982 |
| EP | 56582 A | 7/1982 |
| EP | 129977 A | 6/1983 |
| EP | 776922 A | 6/1997 |
| GB | 2072204 A | 9/1981 |
| WO | 1992/02567 A | 2/1992 |
| WO | 2012/154820 A | 11/2012 |
| WO | 2012/154831 A | 11/2012 |
| WO | 2014/037558 A | 3/2014 |

* cited by examiner

Primary Examiner — John Cooney

(57) ABSTRACT

PIPA polyols are made by reacting a low equivalent weight polyol with a polyisocyanate in the presence of a stabilizer. Low amounts, if any, of water are present. Useful stabilizers include functionalized linear or branched polyethers having at least one polyether segment having a molecular weight of 200 to 8000, wherein the functionalized polyether is terminated at one end with one or more isocyanate groups or with one or more isocyanate-reactive groups linked to the polyether through one or more urea and/or urethane groups, and further wherein all or a portion of such functionalized polyether contains one or more biuret, isocyanurate, urea or allophonate groups.

7 Claims, No Drawings

POLYISOCYANATE POLYADDITION POLYOL MANUFACTURING PROCESS USING STABILIZERS

This invention relates to a method for making dispersions of polyisocyanate polyaddition particles in a polyol useful for the production of flexible polyurethane foam.

Various types of "polymer polyols" are used widely as raw materials for manufacturing flexible polyurethane foam and other polyurethane products. They have a continuous phase made up of one or more compounds having multiple hydroxyl groups (i.e., a "base polyol") into which another polymer is dispersed in the form of small particles. When the polymer polyol is used to make a polyurethane foam, the dispersed polymer particles help to form open cells and to increase the load-bearing of the foam.

Several different types of polymer polyols are produced industrially. One type is known as a "polyisocyanate polyaddition" polyol, or "PIPA" polyol made by the reaction of a low equivalent weight polyol with a polyisocyanate in presence of the base polyol. The dispersed polymer phase is a polyurethane or polyurethane-urea polymer.

An important attribute of all polymer polyol products is the stability of the dispersion over time. The dispersed polymer phase has a strong tendency to separate out from the liquid phase. Therefore, some means of stabilization is needed.

Grafting methods are very commonly used to stabilize the dispersion. Grafting bonds the disperse phase particles to base polyol molecules, which helps to maintain the particles in suspension. This reaction which forms the disperse phase is performed in situ, while the reactants are dispersed or dissolved in the base polyol. Because the base polyol has hydroxyl groups that are reactive with isocyanate groups, the base polyol can to some extent compete with the low equivalent weight polyol for reaction with the isocyanate groups. The reaction between the base polyol and polyisocyanate can result in some grafting.

It is important, however, that the reaction between the low equivalent weight polyol and the polyisocyanate predominates. Otherwise, the reaction of base polyol and polyisocyanate forms a highly viscous product which contains little or no dispersed polymer phase. To produce a useful product, therefore, the reaction that forms the disperse phase must be carefully balanced with the grafting reaction. This is achieved mainly through the selection of the base polyol and the low equivalent weight polyol. The low equivalent weight polyol needs to be more highly reactive towards isocyanate groups than the base polyol.

On the other hand, if the base polyol reacts too slowly, insufficient grafting will occur and PIPA polymer particles will not be stable in the base polyol. This is the case when the base polyol contains mainly secondary hydroxyl groups. The secondary hydroxyl groups react too slowly with isocyanate groups in PIPA manufacturing processes to produce the needed grafting.

For this reason, current commercial PIPA polyols are made using a base polyol mainly terminated with primary hydroxyl groups.

This is a very significant limitation on the types of PIPA polyol products that can be produced, and on the applications in which those PIPA polyols can be used. The most commercially important polyurethane-manufacturing process by far is conventional flexible slabstock foam. Conventional polyurethane foams are based on the use of polyols that contain mainly secondary hydroxyl groups. The slower reactivity of these secondary hydroxyl groups (compared to primary hydroxyls) fits well with the reactivity profile needed in high-volume flexible slabstock foam production. Polyols having mainly primary hydroxyl groups are very seldom used in this application, because those polyols are too reactive, and because their performance is extremely sensitive to the levels of tin catalyst in the formulation. Many commercial slabstock foaming lines are not capable of maintaining tin catalyst levels within the very tight windows required when primary hydroxyl-terminated polyethers are used.

The difficulty in producing PIPA polyols using a mainly secondary hydroxyl-terminated base polyol effectively excludes PIPA polyols from this very broad market. Hence, current commercial PIPA polyols are used mainly for making high resiliency foam, which is made in a process that can tolerate the higher reactivity of the PIPA polyols.

Another problem with making PIPA dispersions using polyols designed for conventional slabstock foam is that the molecular weights of the polyols tends to be lower than those used in other foam applications. The viscosities of the polyols are correspondingly lower. Whereas low viscosity is a desirable attribute of the dispersion for processing reasons, it is often more difficult to form stable dispersions if the polyol viscosity is very low. Polyols designed for conventional slabstock formulations tend to be nominal triols having molecular weights of 2000 to 4000, and due to their low viscosities are less prone to physically stabilize suspended particles than are higher molecular weight polyols commonly used in making molded or high resiliency slabstock foam. This further complicates the stabilization of PIPA particles, in addition to the presence of secondary hydroxyls.

Certain attempts to make stable PIPA polyols using a mainly secondary hydroxyl-terminated base polyol have been made, but none has resulted in a commercially viable approach.

U.S. Pat. No. 4,305,857 describes a process for making a PIPA polyol, in which large quantities of water are added to the formulation. Emulsifying substances can be used in conjunction with the water to control particle size distribution and final viscosity of the dispersion (see column 10, line 63 to 65, and column 12, lines 18 to 21). The need to use large amounts of water causes several significant problems. Much of the excess water must be removed from the product, which leads to very significant increases in energy and equipment costs. It is difficult to remove the water to very low levels, which presents a very significant problem with product quality and consistency from batch-to-batch. The emulsifying substances described in U.S. Pat. No. 4,305,857 are mainly based on poly(ethylene oxide), which is very hydrophilic. The presence of these emulsifiers in the PIPA polyol can cause a foam made from the PIPA polyol to be unacceptably hydrophilic, which can lead to problems with foam properties.

Other stabilizers have been used in PIPA polyol processes. These other stabilizers include previously-formed PIPA polyols (see, e.g., WO 94/20558, WO 2012/154820), as well as silicone compounds or other types of surfactants. However the PIPA polyol products described in these patent applications are based on the use of a reactive carrier polyol containing a high level of primary hydroxyls. These approaches have not been found to be effective, especially when the base polyol is mainly terminated in secondary hydroxyl groups.

In U.S. Pat. No. 4,518,778, the problem of instability is addressed by making the PIPA particles from an alkylene oxide adduct of an alkanolamine, instead of the alkanolamine itself. As the examples in U.S. Pat. No. 4,518,778 show, PIPA polyols made in a secondary hydroxyl-terminated base polyol are not stable when triethanolamine is used as a starting material. The approach described in U.S. Pat. No. 4,518,778 requires special starting materials and therefore increases cost. Furthermore, it has not resulted in a commercially feasible process, at least in connection with a base polyol mainly terminated in secondary hydroxyl groups.

While U.S. Pat. No. 4,374,209 includes examples based on secondary hydroxyl based carrier polyol and diethanolamine, no indication is given of the final product viscosity and particle size distribution. EP 776,922 also includes an example of a dispersion in which the base polyol contains mainly secondary hydroxyl groups and triethanolamine is used as a reactant to make the polyurethane particles, but does not provide particle size or dispersion stability information. These approaches have failed to lead to successful commercial production of a PIPA polyol in which the base polyol has mainly secondary hydroxyl groups. WO 2014/037558 also includes an example of a PIPA dispersion in which the base polyol contains 90% secondary hydroxyl groups, but like EP 776,922 does not provide particle size or dispersion stability information.

U.S. Pat. No. 5,068,280 describes a process in which a seed PIPA dispersion is made in a base polyol having mainly primary hydroxyl groups, and the seed PIPA dispersion is then used to make a second PIPA dispersion. The base polyol in the second PIPA dispersion is terminated mainly with secondary hydroxyl groups. This process requires preheating of components, slow addition of the polyisocyanate and a long reaction time, to produce a dispersion having a bimodal particle size. The process also introduces a significant amount of primary hydroxyl groups into the final product, which can affect its reactivity in ways that make the produce less suitable for conventional slabstock foam manufacturing.

What is desired is an effective and cost-efficient process for making PIPA polyols, especially PIPA polyols in which the base polyol has predominantly secondary hydroxyl groups. The process should permit highly stable PIPA polyols to be produced, in which the dispersed PIPA particles are small (and therefore less prone to settling). In addition, the process should not include ingredients that have a significant adverse effect on the processing of polyurethanes from the PIPA polyols or properties of polyurethanes (especially flexible polyurethane foams) made from the PIPA polyols.

The invention is in one aspect a process for preparing a dispersion of polyisocyanate polyaddition particles in a base polyol, comprising forming an agitated mixture of a low equivalent weight polyol having a hydroxyl equivalent weight of up to 80 and 2 to 6 hydroxyl groups per molecule, one or more polyisocyanate compounds, a stabilizer which is not a polyisocyanate polyaddition (PIPA) polyol and which is not a silicone compound, and a base polyether polyol having a hydroxyl equivalent weight of at least 200, and reacting the low equivalent weight polyol with the polyisocyanate compound(s) in the presence of the base polyether polyol, the stabilizer, 0 to 2.0% by weight water based on the combined weight of the water, base polyol, low equivalent weight polyol, stabilizer and polyisocyanate compound(s), to form the dispersion of polyisocyanate polyaddition particles in the base polyol.

Applicants have surprisingly found that, by including forming the PIPA polyol in the presence of a stabilizer and in the presence of at most small amounts of water, one can easily and inexpensively produce highly stable PIPA polyols that have low viscosities, small particle sizes and excellent stability. No water is needed to obtain stable, low viscosity products. Very surprisingly, the PIPA dispersions are quite stable even when the base polyol has mainly secondary hydroxyl groups. Unlike other commercially available PIPA polyol products, products of this process in which the base polyol has mainly secondary hydroxyl groups are suitable for use in polyurethane-forming processes like slabstock flexible foam production. The PIPA polyols process easily to form polyurethanes having desirable properties. The PIPA polyols are useful in making, for example, flexible polyurethane foam in a conventional slabstock process.

The invention is in another aspect a process for preparing a dispersion of polyisocyanate polyaddition particles in a base polyol, comprising forming an agitated mixture of a low equivalent weight polyol having a hydroxyl equivalent weight of up to 80, one or more polyisocyanate compounds, a stabilizer, a base polyether polyol having a hydroxyl equivalent weight of at least 200, and reacting the low equivalent weight polyol with the polyisocyanate compound(s) in the presence of the base polyether polyol and the stabilizer, to form the dispersion of polyisocyanate polyaddition particles in the base polyol, wherein the stabilizer includes one or more functionalized linear or branched polyether compounds having at least one polyether segment having a molecular weight of 200 to 8000, wherein the functionalized linear or branched polyether compounds are terminated at one end with one or more isocyanate groups or with one or more hydroxyl groups linked to the polyether through one or more urea and/or urethane groups, and further wherein all or a portion of such functionalized linear or branched polyether compounds contain one or more biuret, isocyanurate, urea or allophonate groups.

In a third aspect, the invention is a stabilizer comprising one or more functionalized linear or branched polyether compounds having at least one polyether segment having molecular weight of 200 to 8000, wherein the functionalized linear or branched polyether compound(s) are terminated at one end with one or more isocyanate groups or with one or more hydroxyl groups linked to the polyether through one or more urea and/or urethane groups, wherein all or a portion of such functionalized linear or branched polyether compounds contain one or more biuret, isocyanurate, urea or allophonate groups.

In a fourth aspect, the invention is a process for preparing a stabilizer, comprising reacting a starting polyisocyanate compound having 2 to 6 isocyanate groups per molecule and an isocyanate equivalent weight of up to 250 with a polyether monol having a molecular weight of 700 to 6000 at a weight ratio of 10:90 to 90:10 in the presence of an isocyanate trimerization catalyst to form a product mixture containing one or more isocyanurate compounds, which isocyanurate compounds contain at least one polyether segment having a molecular weight of 1000 to 3000 and have an isocyanate content of at least 1% by weight.

The stabilizer used in this invention is characterized in that it is not a previously formed PIPA polyol, nor is it a silicone compound.

A useful type of stabilizer is a functionalized polyether based on a reaction product of a polyether and a starting polyisocyanate. The functionalized polyether in some embodiments is terminated at one end (and one end only) with one or more isocyanate groups. As such, the functionalized polyether in such embodiments contains a polyether segment of 200-8000 molecular weight, capped at one end with one or more isocyanate groups. Such a functionalized polyether can be represented by structure I:

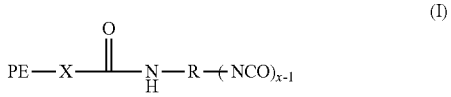

$$\text{PE}-\text{X}-\overset{O}{\underset{H}{\overset{\|}{C}}}-N-R-(\text{NCO})_{x-1} \quad \text{(I)}$$

where R represents the residue, after removal of isocyanate groups, of a starting polyisocyanate having the structure R—(NCO)$_x$; x represents the number of isocyanate groups on the starting polyisocyanate, typically being a number from 2 to 6; PE represents a polyether chain having a molecular weight of 200 to 8000, and X is —O— or —NH—. The PE group in structure 1 preferably is devoid of hydroxyl, primary amino and secondary amino groups.

The functionalized polyether shown in structure I can be prepared in a reaction of a starting polyisocyanate with a monofunctional polyether. The monofunctional polyether has a molecular weight of 200 to 8000, and contains one isocyanate-reactive group per molecule. The isocyanate-reactive group may be, for example, a hydroxyl group, a primary or secondary amino group, a thiol group or an epoxy group. The polyether preferably is a polyether monol or polyether monoamine. The monofunctional polyether preferably has a molecular weight of 400 to 6000, more preferably 600 to 4000, still more preferably 700 to 3000 and in some embodiments 1000 to 3000. Polyether monols are preferred. The polyether may be linear or branched, but linear polyethers are preferred.

The monofunctional polyether preferably is a polymer of one or more cyclic ethers such as, or example, ethylene oxide, 1,2-propylene oxide, 1,3-propylene oxide, 1,2-butylene oxide, tetrahydrofuran and the like. If the monofunctional polyether is a polymer of ethylene oxide, the polymerized ethylene oxide preferably constitutes less than 50% of the weight of the polyether. The selection of monomers is generally made so the stabilizer produced from the monofunctional polyether is soluble in the base polyol used to make a PIPA polyol. The monofunctional polyether most preferably is a homopolymer of propylene oxide or a copolymer of 1,2-propylene oxide and ethylene oxide. A copolymer of propylene oxide and ethylene oxide may contain, for example, 50.5-99.5% by weight polymerized propylene oxide units and correspondingly 49.5 to 0.5% by weight ethylene oxide units (ignoring the weight of any initiator compound). A preferred copolymer contains 60-99.5% by weight polymerized propylene oxide units and correspondingly 40 to 0.5% by weight polymerized ethylene oxide units. A more preferred copolymer contains 75-99.5% by weight polymerized propylene oxide units and correspondingly 25 to 0.5% by weight polymerized ethylene oxide units. A still more preferred copolymer contains 85-99.5% by weight polymerized propylene oxide units and correspondingly 15 to 0.5% by weight polymerized ethylene oxide units.

The monofunctional polyether can be prepared by polymerizing the cyclic ether in the presence of a monofunctional initiator compound. The initiator compound is preferably an alcohol such as methanol, ethanol, 1-propanol, 2-propanol, 1-butanol, 1-hexanol, phenol, benzyl alcohol and the like. The polymerization is generally catalyzed; among the useful catalysts are compounds of alkali metals and alkaline earth metals. Useful alkali metal and alkaline earth compounds include alkali metal hydroxides or alkaline earth hydroxides such as sodium hydroxide, potassium hydroxide, cesium hydroxide, calcium hydroxide and the like, as well as so-called double metal cyanide (DMC) catalysts. The polymerization forms a monol. The monol can be converted to a monoamine via reductive amination, capping with a diisocyanate and then hydrolyzing the remaining isocyanate group to form an amino group, or by other methods. Epoxy groups can be introduced by capping with a diepoxide compound.

It is also possible to produce a starting polyether monol by polymerizing the cyclic ether onto a polyfunctional initiator to produce a polyol, and then capping all of the alcohol groups except one. Capping can be done by reaction with, for example, a monoisocyanate, a carboxylic acid or a carboxylic acid alkyl (preferably methyl) ester.

When the polyether is polymerized in the presence of an alkali metal or alkaline earth metal compounds, the catalyst residues may be left in the product. In such a case, those residues can function as isocyanate trimerization catalysts when a stabilizer is subsequently made. Alternatively, those residues can be removed using well-known methods.

The polyisocyanate compound used to make the functionalized polyether preferably has an isocyanate equivalent weight of up to 300, more preferably up to 250, still more preferably up to 175 and in some embodiments 50 to 175. Examples of useful polyisocyanates for making the functionalized polyether include m-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, 1,3- and/or 1,4-bis(isocyanatomethyl)cyclohexane (including cis- and/or trans isomers) methoxyphenyl-2,4-diisocyanate, diphenylmethane-4,4'-diisocyanate, diphenylmethane-2,4'-diisocyanate, hydrogenated diphenylmethane-4,4'-diisocyanate, hydrogenated diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, a polymethylene polyphenylisocyanate (PMDI), toluene-2,4,6-triisocyanate and 4,4'-dimethyldiphenylmethane-2,2',5,5'-tetraisocyanate. Preferably the polyisocyanate is diphenylmethane-4,4'-diisocyanate, diphenylmethane-2,4'-diisocyanate, PMDI, toluene-2,4-diisocyanate, toluene-2,6-diisocyanate or mixtures thereof. Diphenylmethane-4,4'-diisocyanate, diphenylmethane-2,4'-diisocyanate and mixtures thereof are generically referred to as MDI, and all can be used. Toluene-2,4-diisocyanate, toluene-2,6-diisocyanate and mixtures thereof are generically referred to as TDI, and all can be used.

Enough of the polyisocyanate is used to consume the functional groups of the monofunctional polyether. An excess over that amount may be used, in which case the product will include a mixture of a functionalized polyether as in structure I and unreacted starting polyisocyanate. In some embodiments, the weight ratio of polyisocyanate to monofunctional polyether may be, for example, from 10:90 to 90:10, provided that at least one mole of polyisocyanate is used per mole of monofunctional polyether. A preferred weight ratio is at least 15:85 or at least 20:80, up to 75:25, up to 60:40 or up to 50:50.

An isocyanate-terminated functionalized polyether according to structure I is by itself an effective stabilizer for producing a stable PIPA dispersion. Especially good dispersion stability is obtained when a portion of the functionalized polyether is modified to contain one or more biuret, isocyanurate, urea or allophonate groups as described more fully below. Very surprisingly, the PIPA dispersions are quite stable even when the base polyol has mainly secondary hydroxyl groups. Unlike other commercially available PIPA polyol products, the product of such embodiments of this process, by virtue of having mainly secondary hydroxyl groups, is suitable for use in polyurethane-forming processes like slabstock flexible foam production. The PIPA polyols process easily to form polyurethanes having desirable properties. The PIPA polyols are useful in making, for example, flexible polyurethane foam in a slabstock process.

Biuret-, urea- and/or allophonate-containing species can be formed by reaction of a functionalized prepolymer molecule according to structure I with water and either another prepolymer molecule or a molecule of unreacted starting polyisocyanate compound. This produces a compound having one or more biuret, urea and/or allophonate linkages and at least one (and preferably at least two) polyether chains having a molecular weight corresponding to that of the monofunctional polyether. The reaction with water can be performed simultaneously with the formation of the structure I functionalized polyether, or afterward. The amount of water may be, for example, from 0.05 to 1 part by weight per 100 parts by weight polyether monol or monoamine. The amount of water and the extent of biuret-, urea- and/or allophonate-forming reaction is such that the product contains at least 1 weight percent isocyanate groups. The isocyanate content in such embodiments may be 10 to 75% of that expected to be obtained from the reaction of polyether monol or monoamine and polyisocyanate alone, as described below.

Alternatively, biuret-, urea- and/or allophonate-containing stabilizers can be formed by first reacting the starting polyisocyanate with water to introduce the biuret, urea and/or allophonate groups, and then reacting the resultant material with the monofunctional polyether. The isocyanate content in some such embodiments is 10 to 75% of that expected to be obtained from the reaction of monofunctional polyether and polyisocyanate alone, as described below.

Functionalized polyethers containing one or more isocyanurate groups represent the reaction product of three or more isocyanate compounds, at least one of which is as set forth in structure I above, to form a compound having one or more isocyanurate groups. Isocyanurate groups are cyclic structures having alternating carbon and nitrogen atoms in the ring, formed by the reaction of three isocyanate groups. The isocyanurate-containing functionalized polyethers may be represented by structure (II):

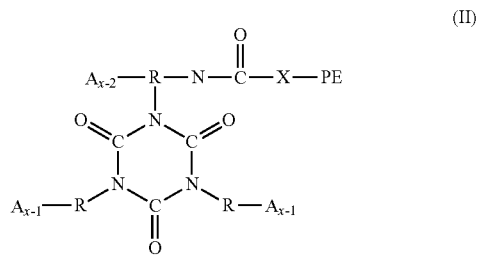

(II)

where each R, PE, X and x are as defined with respect to structure I, and each A is independently

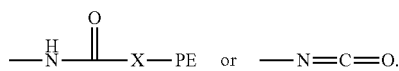

or —N=C=O.

The isocyanurate groups may be formed prior to, simultaneously with, or after the reaction of monofunctional polyether and polyisocyanate to form the structure I functionalized polyether. This trimerization reaction is conveniently performed in the presence of a trimerization catalyst.

In embodiments in which the reaction of monofunctional polyether with the polyisocyanate is performed simultaneously with the trimerization reaction, the monofunctional polyether and polyisocyanate are combined with a trimerization catalyst and allowed to react in one step. It is generally preferred to heat the mixture to promote isocyanurate formation. A temperature of heated to a temperature of 40 to 160°, preferably 40 to 100° C. is generally sufficient. A urethane catalyst may be included in addition to the trimerization catalyst, to promote the reaction of monofunctional polyether with isocyanate groups.

The reaction is continued until the monofunctional polyether has fully reacted and a portion of the remaining isocyanate groups has trimerized to form isocyanurates. If the reaction is continued until all the isocyanate groups are consumed, an intractable, high molecular weight polymer usually forms. For this reason, the reaction should be discontinued before the isocyanate content is reduced to below 1% by weight. It is preferred to continue the reaction until the isocyanate content is brought within the range of 1.5 to 35% by weight. It is more preferred to continue the reaction until the isocyanate content is brought within the range of 2 to 30% by weight. In some embodiments, the isocyanate content of the product mixture is 3 to 30%, 3 to 20% or 3 to 15%. The isocyanate content in some embodiments is 10 to 75% of that expected from the reaction of monofunctional polyether and polyisocyanate alone, as described below.

It is more preferred to continue the stabilizer-forming reaction until the isocyanate content is 10 to 75% of that expected to be obtained from the reaction of monofunctional polyether and polyisocyanate alone (i.e., without consumption of isocyanate groups to form isocyanurates, biurets, ureas and/or allophonates), but not less than about 1% by weight of the product. The expected isocyanate content (in weight-percent) obtained from the reaction of monofunctional polyether and polyisocyanate can be calculated as:

$$\% NCO = \frac{(Eq_{iso} - Eq_{monol}) \times 42}{Wt_{iso} + Wt_{monol}}$$

wherein $Eq_{iso}$ represents the number of equivalents of isocyanate groups introduced into the reaction, $Eq_{monol}$ represents the number of equivalents of monofunctional polyether introduced into the reaction, $Wt_{iso}$ represents the weight of the polyisocyanate compound(s) and $Wt_{monol}$ represents the weight of the monofunctional polyether compounds.

The product formed in the one-step method is typically a mixture of materials. Among the reaction products is an isocyanurate compound substituted with one or more polyether chains. The polyether chains correspond to the polyether portion of the monol or monoamine, and are believed to be bonded to the isocyanurate ring via urethane or urea linkages to the residue of the isocyanate compound, as shown in structure II above.

The number of polyether chains in an isocyanurate-containing compound as described above may be as few as one, or as many as 3(x−1) in structure I. However, it is believed in most cases that the number of polyether chains will be on average significantly less than 3(x−1). In such cases, the product obtained in the reaction will contain species according to structure I above, in which at least some of the A groups are —N=C=O.

The product of the reaction may contain various other reaction products and/or unreacted starting materials, such as, for example, some quantity of unreacted polyisocyanate compound; trimerized species that do not contain polyether groups, such as isocyanurate compounds having structure (III):

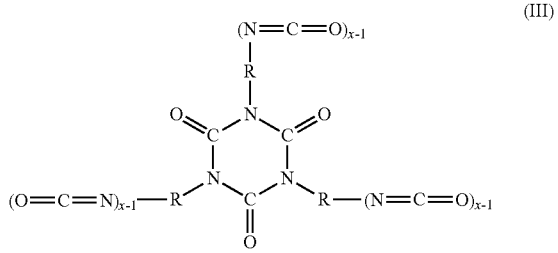

wherein x and R are as described before, in addition to isocyanate-terminated molecules such as those having structure I above. If water is present during the trimerization reaction, biuret-, urea- and/or allophonate-containing species as described above may also form and be present in the product mixture.

The relative amounts of these various species will depend primarily on the relative amounts of polyether monol or monoamine and polyisocyanate used, the extent to which the trimerization reaction is continued, and the presence of water, if any. In general, a greater proportion of polyisocyanate in the starting materials favors the production of a mixture contain more unreacted polyisocyanate and/or more trimerized species that do not contain polyether groups (as well as a lower average number of polyether groups in the Structure II compounds). Continuing the reaction (i.e., reducing the isocyanate content of the product) leads to more trimerized species, less unreacted polyisocyanate and fewer non-trimerized reaction products of the starting polyisocyanate and polyether monol.

The reaction to form an isocyanurate-containing functionalized polyether also can be performed sequentially by first reacting the polyisocyanate with the monofunctional polyether, and then performing the trimerization reaction. This may result in a more defined product. In this variation of the process, the monofunctional polyether and polyisocyanate are allowed to react until the hydroxyl or amino groups of the polyether are consumed. A trimerization catalyst is added, and the reaction is continued under the conditions described before. As before, it is preferred to discontinue the reaction before the isocyanate content is reduced to below 1% by weight (corresponding to an isocyanate equivalent weight of 4200). It is more preferred to reduce the isocyanate content to about 10 to 75% of the isocyanate content that would be obtained in the absence of any trimerization, i.e., if the only reaction that occurred was that between the monofunctional polyether and the polyisocyanate. The product of the two-step process includes compounds containing an isocyanurate and one or more polyether groups, such as those according to structure II above, and may also contain species corresponding to structures I and III, as well as some quantity of unreacted polyisocyanate compound.

Of course, variations of either of the foregoing processes can be used.

In any of the foregoing processes, it is preferred to continue the reaction until the isocyanate content is brought within the range of 1.5 to 35% by weight. It is more preferred to continue the reaction until the isocyanate content is brought within the range of 2 to 30% by weight. In some embodiments, the isocyanate content of the product mixture is 3 to 30%, 3 to 20% or 3 to 15%.

Useful isocyanate trimerization catalysts include strong bases such as alkali metal phenolates, alkali metal alkoxides, alkali metal carboxylates, quaternary ammonium salts, and the like. Among the alkali metal trimerization catalysts are sodium p-nonylphenolate, sodium p-octyl phenolate, sodium p-tert-butyl phenolate, sodium formate, sodium acetate, sodium propionate, sodium butyrate, sodium 2-ethylhexanoate, glycine N-[(2-hydroxy-5-nonylphenyl)methyl]-N-methyl-monosodium salt, potassium p-nonylphenolate, potassium p-octyl phenolate, potassium p-tert-butyl phenolate, potassium formate, potassium acetate, potassium propionate, potassium butyrate, potassium 2-ethylhexanoate, glycine N-[(2-hydroxy-5-nonylphenyl)methyl]-N-methyl-monopotassium salt, cesium p-nonylphenolate, cesium p-octyl phenolate, cesium p-tert-butyl phenolate, cesium formate, cesium acetate, cesium propionate, cesium butyrate, cesium 2-ethylhexanoate and glycine N-[(2-hydroxy-5-nonylphenyl)methyl]-N-methyl-monocesium salt. Among the useful ammonium salts are (2-hydroxypropyl)trimethylammonium 2-ethylhexanoate, (2-hydroxypropyl)trimethylammonium formate and the like. Compounds such as N,N',N"-tris(3-dimethylaminopropyl) hexahydro-s-triazine or aminophenols are also useful trimerization catalysts. Imidazolium or imidazolinium salts can also be used as trimerization catalysts, such as 1-ethyl, 2-methyl-imidazolium acetate, 1,3-di-tert-butyl-imidazolinium acetate, 1,3-diadamantyl-imidazolium acetate, 1,3-diisopropyl-imidazolium acetate 1,3-di-tert-butyl-imidazolium acetate, 1-butyl-3-methylimidazolium acetate, and others disclosed in US 2011/0201709 A1. The alkali metal and ammonium compounds are generally preferred.

When the monofunctional polyether is prepared using an alkali metal hydroxide catalyst, catalyst residues contained in the polyether monol may serve as the isocyanate trimerization catalyst.

The product obtained from any of the foregoing processes contains species that contain isocyanate groups. When the product (or isocyanate-containing species therefrom) is used as a stabilizer to make a PIPA polyol, the isocyanate groups can react with the low equivalent weight polyol to graft the isocyanate-containing species to the PIPA particles that are produced. When the product has a high isocyanate content, such as 15 to 30%, it tends to contain significant quantities of unreacted starting polyisocyanate compounds. When the product contains unreacted starting polyisocyanate compounds, it can be used both as the stabilizer and all or part of the polyisocyanate compound in the PIPA-forming process.

The isocyanate groups of foregoing functionalized polyethers (including those containing biuret, urea, allophonate and/or isocyanurate groups) can be capped with a compound that replaces the isocyanate groups with one or more isocyanate-reactive groups. Such a capping compound may be, for example, a polyol or aminoalcohol, each of which replaces the isocyanate groups with hydroxyl groups. The isocyanate-reactive groups are linked to the polyether segment of the functionalized polyether through one or more urea and/or urethane groups. A hydroxyl-terminated functionalized polyether of this type may have a structure according to structure IV:

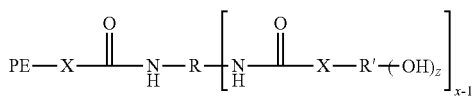

in which PE, X, and R are as defined before, z is a number from 1 to 5, preferably 1 to 2, and R' is the residue, after removal of a hydroxyl and/or an amino group of the capping polyol or aminoalcohol. A capped isocyanurate-containing compound having hydroxyl groups may have a structure according to structure V:

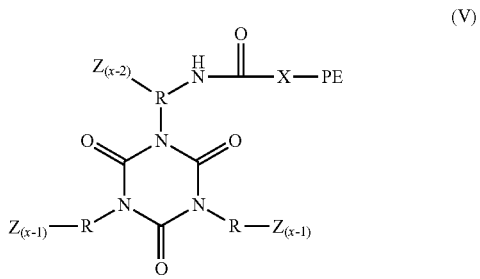

wherein X, R, PE and x are as described before, and each Z is

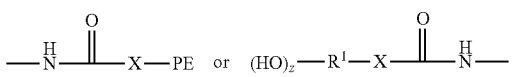

wherein $R^1$ is the residue of the polyol capping agent, z is from 1 to 5, preferably 1 or 2, and X is as defined before, and provided that at least one Z is

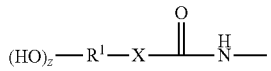

The preferred polyol or aminoalcohol used as a capping agent suitably has a hydroxyl equivalent weight of up to 399, more preferably up to 150 and especially up to 80, and suitably contains 2 to 6 hydroxyl groups and zero or one primary or secondary amino group. Examples include ethylene glycol, diethylene glycol, triethylene glycol, 1,3-propane diol, 1,2-propane diol, dipropylene glycol, tripropylene glycol, glycerin, trimethylolpropane, trimethylolethane, pentaerythritol, erythritol, sucrose, diethanolamine, triethanolamine, triisopropanolamine, diisopropanolamine, and the like. Aminoalcohols such as triethanolamine are preferred. Mixtures of two or more of the foregoing can be used.

If the functionalized polyether contains hydroxyl groups, it may be combined with the low equivalent weight polyol and the resulting combination introduced together into the PIPA forming process. Alternatively, such a hydroxyl-containing functionalized polyether may be combined with the base polyol separately from the low equivalent weight polyol, in either order or simultaneously.

The stabilizers described above are used in a process to make polyisocyanate polyaddition (PIPA) polyols. Such a process generally involves forming an agitated mixture of a low equivalent weight polyol having a hydroxyl equivalent weight of up to 80, one or more polyisocyanate compounds, a stabilizer (or a product mixture containing a stabilizer as described above) and a base polyether polyol having a hydroxyl equivalent weight of at least 200, and reacting the low equivalent weight polyol with the polyisocyanate compound(s) in the presence of the base polyether polyol and the stabilizer compound to form the dispersion of polyisocyanate polyaddition particles in the base polyol.

In certain aspects of the invention, the PIPA polyol is prepared in the presence of 0 to 2 parts, preferably 0 to 0.5 parts, of water, based on the combined weight of the water, base polyol, low equivalent weight polyol, stabilizer and polyisocyanate compound(s). The amount of water is more preferably 0 to 0.15 parts. This water, when present, is typically carried into the process as an impurity in the base polyol(s), which as industrial products typically contain 0.01 to 0.25% by weight water. It is preferred not to add water in addition to that carried into the process with the base polyol(s).

The base polyether polyol used as a starting material in this invention has a nominal functionality of at least 2.0. By "nominal" functionality, it is meant the average number of oxyalkylatable hydrogens per molecule of the initiator(s) used in making the base polyol. The nominal functionality preferably is at least 2.5 and more preferably at least 3.0. It may be as high as 6.0, but more preferably is no more than 4.0.

The hydroxyl groups of the base polyether polyol may be primary or secondary hydroxyls, or some mixture of both. An advantage of the invention is that the stabilizer performs very effectively even when the base polyether polyol contains mainly secondary hydroxyl groups. This result is quite surprising because PIPA polyols have not been previously produced successfully at a commercial scale using a base polyol having mainly secondary hydroxyl groups. Accordingly, in some embodiments, at least 75% of the hydroxyl groups of the base polyol are secondary hydroxyls. At least 85%, at least 92%, at least 95% or at least 98% of the hydroxyl groups may be secondary hydroxyls. Conversely, no more than 25%, no more than 15%, no more than 8%, no more than 5% or no more than 2% of the hydroxyl groups of the base polyol may be primary hydroxyls.

The base polyol preferably is a homopolymer or copolymer of propylene oxide. Homopolymers of propylene oxide typically contain very small proportions, if any, of primary hydroxyl groups—typically, 0 to about 8% of the hydroxyl groups are primary, and in some cases 0 to 2% of the hydroxyl groups are primary. The selection of catalyst can affect the number of primary hydroxyl groups present. For instance, typically less than 2% of the hydroxyl groups of propylene oxide homopolymers made with alkali metal catalysts are primary, whereas up to about 8% of the hydroxyl groups of a propylene oxide homopolymer made using a double metal cyanide catalyst complex often may be primary.

Useful copolymers of propylene oxide include random copolymers of propylene oxide and ethylene oxide, in which the copolymer contains a low proportion of primary hydroxyl groups as described above. These are prepared by polymerizing a mixture of propylene oxide and ethylene oxide. The mixture preferably contains at least 80% by weight propylene oxide and no more than 20% ethylene oxide. A more preferred mixture contains 85 to 99.5% by weight propylene oxide and 0.5 to 15% by weight ethylene oxide.

Another useful copolymer of propylene oxide is a block copolymer containing one or more internal blocks of polymerized ethylene oxide and terminal blocks of polymerized propylene oxide, once again provided the copolymer contains a proportion of primary hydroxyl groups as described before. The ethylene oxide block or blocks can in the aggregate constitute 0.5 to 30% of the weight of the copolymer, although a preferred weight of the block or blocks is 0.5 to 20% of the total weight of the copolymer.

The base polyol can be prepared by polymerizing the oxide or oxides in the presence of an initiator compound or mixture of initiator compounds. If a single initiator compound is used, that compound contains at least two oxyalkylatable hydrogen atoms. Hydroxyl groups, primary amine groups, secondary amine groups and thiol groups are examples of groups that contain oxyalkylatable hydrogen atoms. Primary amine groups each contain two oxyalkylatable hydrogens. Examples of initiator compounds are water, ethylene glycol, 1,2-propane diol, 1,3-propane diol, diethylene glycol, dipropylene glycol, triethylene glycol, tripropylene glycol, cyclohexanedimethanol, methyl amine, ethyl amine glycerin, trimethylolpropane, trimethylolethane, pentaerythritol, erythritol, sucrose, sorbitol, mannitol, diethanolamine, monoethanolamine, triethanolamine, ethylene diamine, toluene diamine, 1,2-propane diamine, and the like. Mixtures of two or more of the foregoing initiators can be used.

The base polyol may also be a mixture of polyether polyols, each made separately using a different initiator, and each having a hydroxyl equivalent weight as described below, which are then blended to form a mixture having an average functionality as described before.

The hydroxyl equivalent weight of the base polyol is at least 200, and may be as high as about 6000. A preferred hydroxyl equivalent weight is 360 to 3000, a more preferred equivalent weight is 500 to 2000 and an especially preferred equivalent weight is 900 to 1350. If the base polyol is a mixture of two or more separately made polyether polyols, each of the separately made polyols should have hydroxyl equivalent weights within these ranges.

An especially preferred base polyol is a nominally trifunctional poly(propylene oxide) homopolymer or nominally trifunctional random copolymer of 80 to 99.5% by weight propylene oxide and 0.5 to 20% by weight ethylene oxide, in each case having a hydroxyl equivalent weight of 800 to 2000, especially 900 to 1350, in which 92 to 100%, more preferably 98 to 100%, of the hydroxyl groups are secondary hydroxyl groups, or a mixture of two or more such polyols.

Useful polyisocyanates include those described before with respect to making the stabilizer.

The low equivalent weight polyol used in making the PIPA has an equivalent weight of up to 80, preferably up to 75. It has 2 to 6, preferably 2 to 3, hydroxyl groups per molecule. It is preferred that it contains at least two primary hydroxyl groups (and optionally one or more secondary hydroxyl groups as well), and/or is an aminoalcohol. It preferably has low miscibility in the base polyol, such that, at the relative amounts used the process, the low equivalent weight polyol disperses in the base polyol in the form of small droplets. Aminoalcohol compounds are preferred types. Specific low equivalent weight polyols include those described before as capping agent for making a hydroxyl-capped stabilizer or stabilizer mixture. Triethanolamine is a highly preferred low equivalent weight polyol, and can be used by itself or as a mixture with one or more of the foregoing. Such a mixture may contain, for example, 75 to 99.9% by weight triethanolamine.

The order of addition of base polyol, polyisocyanate, low equivalent weight polyol and stabilizer is generally not critical, provided that the reaction of the low equivalent polyol with the polyisocyanate occurs in the presence of the base polyol and stabilizer. If the stabilizer contains isocyanate groups or is added as a mixture with one or more other isocyanate-containing compounds, it may be combined with the polyisocyanate (if additional polyisocyanate is needed) and the resulting combination introduced together into the PIPA polyol-forming process. Alternatively, the stabilizer may be introduced separately from the polyisocyanate, in either order or simultaneously. The low equivalent weight polyol can be introduced prior to, simultaneously with or after an isocyanate-containing stabilizer and additional polyisocyanate (if any). However, if added after the isocyanate-containing species, it is preferred not to add the urethane catalyst until the low equivalent weight polyol is added, to avoid premature reaction of the base polyol with the isocyanates.

It is also possible to introduce the low equivalent weight polyol and polyisocyanate compound simultaneously, as through a mixhead, in which case the stabilizer or mixture can be added to the base polyol beforehand or simultaneously with the low equivalent weight polyol and polyisocyanate (including as a mixture with either).

The amounts of stabilizer, additional polyisocyanate (including any unreacted starting polyisocyanate used to make the stabilizer which remains with the stabilizer), low equivalent weight polyol and any optional seed PIPA polyol (as described below) preferably are selected together to provide a solids content from 1 to 50% by weight, preferably 5 to 30% by weight and more preferably 8 to 25% by weight and especially 8 to 15% by weight. Solids content refers to the weight of the PIPA particles as a percentage of the total weight of the dispersion. For purposes of this invention, the weight of the PIPA particles is a calculated weight, equal to the combined weight of (a) the polyisocyanates used in making the stabilizer, (including any unreacted starting polyisocyanate used to make the stabilizer which remains with and is added with the stabilizer), (b) additional polyisocyanates introduced into the PIPA-forming process, (c) the low equivalent weight polyol and (d) seed PIPA particles, if any. The weight of the polyisocyanates used in making the stabilizer is taken as the weight of the stabilizer multiplied by the weight percentage of polyisocyanate compounds used in stabilizer-forming reaction.

In addition, the amounts of stabilizer, additional polyisocyanate compound and low equivalent weight polyol preferably are selected together to provide 0.5 to 2, preferably 0.65 to 1.5 isocyanate groups per hydroxyl group provided by the low equivalent weight polyol.

As mentioned above, in cases in which the stabilizer is provided as a mixture which contains a large amount of unreacted starting polyisocyanate, it may not be necessary to provide an additional polyisocyanate compound into the PIPA polyol-forming process.

The amount of stabilizer in some embodiments is from 0.1 to 15 parts by weight per 100 parts by weight base polyol. A preferred lower amount is at least 0.5 parts by weight per 100 parts by weight base polyol. A preferred upper amount is 10 parts by weight, with an upper amount of 5 or 2.5 parts by weight, per 100 parts of base polyol, being especially preferred.

The amount of low equivalent weight polyol preferably is sufficient to consume the isocyanate groups provided to the reaction mixture. A large excess of low equivalent weight polyol is not necessary, and for that reason it is preferred to add no more than 2 equivalents thereof per equivalent of isocyanate groups. An especially preferred amount is 1.05 to 1.75 or 1.3 to 1.6 equivalents of the low equivalent weight polyol per equivalent of isocyanate groups.

In terms of weight, about 1 to 50 parts of the low equivalent weight polyol per 100 parts by weight of base polyol typically are used, although this will vary with the amount of isocyanate groups present in the mixture formed in step (a) of the process and any additional polyisocyanate(s) added to such mixture. A preferred amount is at least 2 parts, more preferably at least 3 parts per 100 parts by weight of base polyol. A preferred upper amount is up to 20 parts, more preferably up to 15 parts by weight per 100 parts by weight of the base polyol. In some specific embodiments, 3 to 10 or 3 to 7 parts by weight are used per 100 parts by weight of base polyol.

The amount of additional polyisocyanate can be, for example, 0 to 50 parts by weight per 100 parts by weight of base polyol. A preferred amount is at least 2 parts, more preferably at least 3 parts, per 100 parts by weight of base polyol. A preferred upper amount is up to 20 parts, more preferably up to 15 parts by weight per 100 parts by weight of the base polyol. In some specific embodiments, 3 to 10 or 3 to 7 parts by weight of polyisocyanate are combined per 100 parts by weight of base polyol.

The mixture of materials is then caused to react to form polyisocyanate polyaddition (PIPA) particles dispersed in the base polyol. The conditions for the reaction typically include agitation and/or turbulent flow conditions, which helps to disperse the low equivalent weight polyol into droplets until such time as it reacts with isocyanate compounds to form polymer particles. Agitation and/or turbulent flow conditions can be provided in any convenient way, using any convenient apparatus, such as various types of agitated vessels, static mixing devices, ultrasonic mixing devices or other mechanical agitation devices. In preferred embodiments, the low equivalent weight polyol is dispersed to form fine droplets, typically less than 5 µm or even less than 2 µm diameter, in the base polyol or in the mixture of base polyol and the polyisocyanate compound.

The mixture of base polyol, stabilizer, polyisocyanate and low equivalent weight polyol preferably is maintained under agitation and/or turbulent flow conditions until the low equivalent weight isocyanate-reactive compound has reacted with isocyanate groups in the base polyol mixture to form polyisocyanate polyaddition particles. It is not necessary to maintain agitation or turbulent flow conditions until all isocyanate groups are consumed, provided that agitation is maintained until the particles have formed. Particle formation is indicated by a visible formation of a highly opaque dispersion. Typically agitation and/or turbulent flow conditions are maintained until at least 50%, preferably at least 75% of the isocyanate groups have been consumed.

A urethane catalyst is typically present to promote the PIPA-forming reaction. The urethane catalyst is a material which catalyzes the reaction of a hydroxyl group with an isocyanate group. Suitable catalysts include, for example, including tertiary amines, cyclic amidines, tertiary phosphines, various metal chelates, acid metal salts, strong bases, various metal alcoholates and phenolates and metal salts of organic acids. Catalysts of most importance are tertiary amine catalysts, cyclic amidines, and tin catalysts. Examples of tertiary amine catalysts include: trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Mixtures of these tertiary amine catalysts are often used.

Examples of tin catalysts are stannic chloride, stannous chloride, stannous octoate, stannous oleate, dimethyltin dilaurate, dibutyltin dilaurate, other tin compounds of the formula $SnR_n(OR)_{4-n}$, wherein R is alkyl or aryl and n is 0-2, and the like. Tin catalysts are generally used in conjunction with one or more tertiary amine catalysts, if used at all. Tin catalysts tend to be strong gelling catalysts, so they are preferably used in small amounts, if used at all. It has been found that the use of tin catalysts can have a deleterious effect on the stability of the dispersion, especially when the dispersion is produced at a solids level of greater than 10%, such as 15 to 40%, and especially when the low equivalent weight polyol is triethanolamine. In addition, in some jurisdictions tin catalysts are facing governmental regulations that may limit their use. Therefore, it is preferred to omit tin catalysts, and to use instead one or more urethane catalysts that do not contain tin.

Catalysts are typically used in small amounts, for example, each catalyst being employed from about 0.0015 to about 5% by weight of base polyol.

The PIPA-forming reaction may be performed at a temperature of, for example, 0 to 100° C. An elevated temperature may be desirable to reduce reaction time, but this is often not necessary. If the temperature is too high, and it may become more difficult to control the extent of reaction between the base polyol and isocyanate-containing species, which can lead to high product viscosity. Typically, the base polyol, polyisocyanate and catalyst are mixed while the components are at a temperature of 0 to 100°, preferably 10 to 70° C. and more preferably 20 to 60° C. The mixture is then allowed to react. This can be done without further applied heat if desired. The reaction of the base polyol and polyisocyanate is exothermic and may result in a temperature increase even if no heat is applied. Cooling can be applied if necessary to prevent excessive temperature increases due to the exothermic heat of reaction.

The reaction to form polyisocyanate polyaddition particles typically requires from 30 seconds to one hour, although this depends on factors such as temperature. A more preferred time of reaction is 1 minute to 10 minutes, and in specific embodiments is 2 to 7 or 2 to 5 minutes. A somewhat longer time may be required for essentially all of the isocyanate groups to react.

A previously formed PIPA polyol can be included with the base polyol or even constitute the base polyol if desired, in addition to the stabilizer as described before. If a previously formed PIPA polyol is present, it is preferred to add enough of the previously formed PIPA polyol to provide 0.05 to 20 parts by weight of PIPA particles per 100 parts by weight base polyol. The continuous polyol phase of any such PIPA polyol is considered as part of the base polyol in this invention.

The use of a previously formed PIPA polyol as all or part of the base polyol is a useful way to make high solids dispersions. In essence, this embodiment produces a high solids PIPA polyol by producing the PIPA particles in stages. A PIPA polyol having a solids content of, for example 5 to 20% by weight is produced. Then, more stabilizer, more low equivalent weight polyol and, if necessary, more polyisocyanate is added and the polyaddition reaction repeated, increasing the solids level of the dispersion. This has been found to be an effective way of making high solids dispersions with small particles and good stability. The particle size is typically smaller, and the dispersion stability generally better, at equivalent solids, when the PIPA dispersion is made in such a multi-step process. This process is particularly useful in making dispersions using a base polyol in which 8% or fewer of the hydroxyl groups are primary hydroxyl groups.

Other stabilizers such as silicone surfactants may be included in the process, but preferably are omitted.

The process for making the PIPA polyol can be performed batch-wise, in a semi-batch process, or continuously.

Upon completion of the reaction, the crude PIPA polyol can be stripped or otherwise treated to remove unreacted materials, volatile reaction by-products, and the like. Stripping can be performed, for example, by applying vacuum, preferably coupled with an elevated temperature. A stripping agent can be bubbled through the product to facilitate removal of these materials. Filtering of the PIPA polyol can be performed if desired, but an advantage of this invention is that large, unstable agglomerates tend to be formed in very small quantities if at all, making filtering unnecessary in many cases. Thus, in some embodiments, a filtering step can be omitted, and the PIPA polyol used without filtration.

The product is a dispersion of polyisocyanate polyaddition (PIPA) particles in the base polyol. The dispersion may contain, for example 1 to 50%, 5 to 30%, 8 to 25% or 8 to 15% by weight of the dispersed polyol particles. For purposes of this invention, the weight of the dispersed polyol particles is taken to be that of the combined weight of the polyisocyanate and the low equivalent weight polyol added into the process, including the weight of polyisocyanate used in the preparation of the stabilizer.

An advantage of this invention is that the dispersions are highly stable with small particles. The dispersed PIPA particles typically have a particle diameter in the range of 0.05 to 20 μm. In preferred embodiments, at least 90 volume-% of the particles have a particle size of 0.05 to 10 μm, and in more preferred embodiments at least 90 volume-% of the particles have a particle size of 0.05 to 5 μm.

In some embodiments, a bimodal or multimodal distribution of particle sizes is produced.

In all cases, a small fraction of larger agglomerates of primary particles may be present. However, these agglomerates tend to remain stably dispersed in the base polyol.

The particles are believed to be at least partially stabilized against settling by the stabilizer. In cases in which the stabilizer is a functionalized polyether as described above, the stabilizer is believed to further react with the low equivalent weight polyol or polyisocyanate during the PIPA-forming reaction and in that way becomes grafted onto the polyisocyanate polyaddition particles. The polyether chains corresponding to the residue of the polyether monol molecules used in making the functionalized polyether type of stabilizer are believed to be soluble in the remaining base polyol, and so help to maintain the PIPA particles in suspension.

In some embodiments, the dispersion has a viscosity of 0.5 to 20 Pa·s at 20° C. In other embodiments, the viscosity at 20° C. is 0.75 to 5 Pa·s or 0.75 to 2.5 Pa·s.

In some embodiments, the dispersion exhibits thixotropic behavior. Thixotropic behavior is believed to be favored by (1) the presence of larger amounts of isocyanurate groups in the stabilizer and/or (2) the use of higher levels of stabilizer in making the dispersion. In preferred embodiments, the viscosity of the dispersion exhibits little or no shear-dependence, and so is not thixotropic.

A dispersion made in accordance with the invention is useful in making polyurethanes by reaction with a polyisocyanate. When the hydroxyl groups of the base polyol are mainly secondary hydroxyl groups, the dispersion is useful for making slabstock flexible polyurethane foam.

In the slabstock foaming process, the dispersion of the invention is combined with a polyisocyanate and reacted in the presence of a blowing agent to form the foam. The mixed starting materials are dispensed into a region, typically a trough, in which they react and rise in at least one direction (typically vertically) without constraint or under minimal constraint (such as the weight of a plastic film) and cured to form the foam. Suitable methods for making slabstock polyurethane foam are described, for example, in U.S. Pat. Nos. 5,582,840 and 4,970,243.

Suitable polyisocyanates for use in making slabstock flexible polyurethane foam include those described above.

Suitable blowing agents include physical (endothermic) blowing agents such as various low-boiling chlorofluorocarbons, fluorocarbons, hydrocarbons and the like. Chemical (exothermic) blowing agents that decompose or react under the conditions of the polyurethane-forming reaction are also useful. By far the most preferred chemical blowing agent is water, which reacts with isocyanate groups to liberate carbon dioxide and form urea linkages. Water is preferably used as the sole blowing agent, in which case about 1 to about 7, especially from about 2.5 to about 5, parts by weight water are typically used per 100 parts by weight high equivalent weight polyol. Water may also be used in combination with a physical blowing agent, particularly a fluorocarbon or hydrocarbon blowing agent. In addition, a gas such as carbon dioxide, air, nitrogen or argon may be used as the blowing agent in a frothing process. Carbon dioxide can also be used as a liquid or as a supercritical fluid.

It is highly preferred to include a foam-stabilizing surfactant in the foam formulation. The foam-stabilizing surfactant helps stabilize the gas bubbles formed by the blowing agent during the foaming process until the polymer has cured. A wide variety of silicone surfactants as are commonly used in making polyurethane foams can be used in making the foams with the polymer polyols or dispersions of this invention. Examples of such silicone surfactants are commercially available under the tradenames Tegostab™ (Th. Goldschmidt and Co.), Niax™ (GE OSi Silicones) and Dabco™ (Air Products and Chemicals). In addition to the foregoing components, the polyurethane foam formulation may contain various other optional ingredients such as other polyols, crosslinkers, chain extenders, cell openers; fillers such as melamine and calcium carbonate; pigments and/or colorants such as titanium dioxide, iron oxide, chromium oxide, azo/diazo dyes, phthalocyanines, dioxazines and carbon black; reinforcing agents such as fiber glass, carbon fibers, flaked glass, mica, talc and the like; biocides; preservatives; antioxidants; flame retardants; and the like.

In specific embodiments, the invention is:

1. A process for preparing a dispersion of polyisocyanate polyaddition particles in a base polyol, comprising forming an agitated mixture of a low equivalent weight polyol having a hydroxyl equivalent weight of up to 80 and 2 to 6 hydroxyl groups per molecule, one or more polyisocyanate compounds, a stabilizer which is not a polyisocyanate polyaddition (PIPA) polyol and which is not a silicone compound, and a base polyether polyol having a hydroxyl equivalent weight of at least 200, and reacting the low equivalent weight polyol with the polyisocyanate compound(s) in the presence of the base polyether polyol, the stabilizer, 0 to 2.0% by weight water based on the combined weight of the water, base polyol, low equivalent weight polyol, stabilizer and polyisocyanate compound(s), to form the dispersion of polyisocyanate polyaddition particles in the base polyol.

2. The process of embodiment 1 wherein the stabilizer includes at least one functionalized linear or branched polyether compound having at least one polyether segment having a molecular weight of 200 to 8000, wherein the functionalized linear or branched polyether compound(s) are terminated at one end with one or more isocyanate groups or with one or more hydroxyl groups linked to the polyether through one or more urea and/or urethane groups, and further wherein all or a portion of such functionalized linear or branched polyether compounds contain one or more biuret, isocyanurate, urea or allophonate groups.

3. The process of embodiment 2 wherein the functionalized linear or branched polyether compounds are a reaction product of a monofunctional polyether having a molecular weight of 700 to 8000 and one isocyanate-reactive group, and a polyisocyanate having an isocyanate equivalent weight of up to 300.

4. The process of embodiment 3, wherein the monofunctional polyether contains 50.5-99.5% by weight polymerized propylene oxide units and correspondingly 49.5-0.5% by weight ethylene oxide units.

5. The process of embodiment 4, wherein the monofunctional polyether contains 85-99.5% by weight polymerized propylene oxide units and correspondingly 15-0.5% by weight polymerized ethylene oxide units.

6. The process of embodiment 3, 4 or 5, wherein the monofunctional polyether is a polyether monol.

7. The process of any of embodiments 3-6, wherein all or a portion of the functionalized linear or branched polyether compounds contain one or more isocyanurate groups.

8. The process of embodiment 7, wherein the functionalized linear or branched polyether compounds containing one or more isocyanurate groups have structures represented by structure I

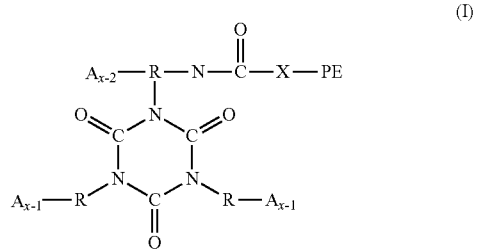

where each R represents the residue, after removal of isocyanate groups, from a starting polyisocyanate compound having the structure R—(NCO)$_x$; each x is a number from 2 to 6 representing the number of isocyanate groups on the starting polyisocyanate compound, PE represents a polyether chain of 700 to 8000 molecular weight, each X independently is —O— or —NH—, and each A is independently

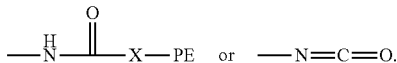

9. The process of embodiment 8 wherein the stabilizer is provided as a mixture which further contains one or more of (a) unreacted starting polyisocyanate compound and (b) one or more trimerized species that do not contain any polyether group.

10. The process of any of embodiments 3-6, wherein all or a portion of the functionalized linear or branched polyether compounds contain one or more biuret, urea or allophonate groups.

11. A process for preparing a dispersion of polyisocyanate polyaddition particles in a base polyol, comprising forming an agitated mixture of a low equivalent weight polyol having a hydroxyl equivalent weight of up to 80, one or more polyisocyanate compounds, a stabilizer, a base polyether polyol having a hydroxyl equivalent weight of at least 200, and reacting the low equivalent weight polyol with the polyisocyanate compound(s) in the presence of the base polyether polyol and the stabilizer, to form the dispersion of polyisocyanate polyaddition particles in the base polyol, wherein the stabilizer includes one or more functionalized linear or branched polyether compounds having at least one polyether segment that have a molecular weight of 200 to 8000, wherein the functionalized linear or branched polyether compounds are terminated at one end with one or more isocyanate groups or with one or more isocyanate-reactive groups linked to the polyether through one or more urea and/or urethane groups, and further wherein all or a portion of such functionalized linear or branched polyether compounds contain one or more biuret, isocyanurate, urea or allophonate groups.

12. The process of embodiment 11 wherein the functionalized linear or branched polyether compound(s) are a reaction product of a monofunctional polyether having a molecular weight of 700 to 8000 and a polyisocyanate having an isocyanate equivalent weight of up to 300.

13. The process of embodiment 12, wherein the monofunctional polyether contains 50.5-99.5% by weight polymerized propylene oxide units and correspondingly 49.5-0.5% by weight polymerized ethylene oxide units.

14. The process of embodiment 13, wherein the monofunctional polyether contains 85-99.5% by weight polymerized propylene oxide units and correspondingly 15-0.5% by weight polymerized ethylene oxide units.

15. The process of embodiment 12, 13 or 14, wherein the monofunctional polyether is a polyether monol.

16. The process of any of embodiments 12-15, wherein all or a portion of the functionalized linear or branched polyether compound(s) contain one or more isocyanurate groups.

17. The process of any of embodiments 12-16, wherein the functionalized linear or branched polyether compound(s) containing one or more isocyanurate groups have a structure represented by

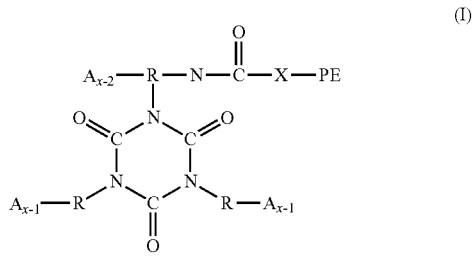

where each R represents the residue, after removal of isocyanate groups, from a starting polyisocyanate compound having the structure R—(NCO)$_x$; each x is a number from 2 to 6 representing the number of isocyanate groups on the starting polyisocyanate compound, PE represents a polyether chain of 700 to 8000 molecular weight, each X independently is —O— or —NH—, and each A is independently

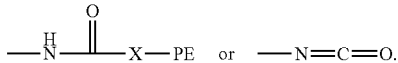

18. The process of any preceding numbered embodiment wherein the stabilizer contains 1 to 35% by weight isocyanate groups.

19. The process of embodiment 18 wherein the stabilizer contains 3 to 15% by weight isocyanate groups.

20. The process of any preceding numbered embodiment wherein the 92 to 100% of the hydroxyl groups of the base polyol are secondary hydroxyl groups.

21. The process of any preceding numbered embodiment wherein the base polyol has a hydroxyl equivalent weight of 200 to 6000.

22. The process of any preceding numbered embodiment wherein the polyisocyanate includes toluene diisocyanate or diphenylmethane diisocyanate.

23. The process of any preceding numbered embodiment wherein the low equivalent weight polyol is an aminoalcohol.

24. The process of embodiment 23 wherein the aminoalcohol is triethanolamine or a mixture of 75-99.9 weight-% triethanolamine and 0.1 to 25 weight-% of another low equivalent weight polyol.

25. A stabilizer comprising one or more functionalized linear or branched polyether compounds having at least one polyether segment having molecular weight of 200 to 8000 wherein the functionalized linear or branched polyether compounds are terminated at one end with one or more isocyanate groups or with one or more isocyanate-reactive groups linked to the polyether through one or more urea and/or urethane groups, wherein all or a portion of such functionalized linear or branched polyether compounds contain one or more biuret, isocyanurate, urea or allophonate groups.

26. The stabilizer of embodiment 25 wherein the functionalized linear or branched polyether compound(s) are a reaction product of a monofunctional polyether having one isocyanate-reactive group and a molecular weight of 700 to 8000 and a polyisocyanate having an isocyanate equivalent weight of up to 300.

27. The stabilizer of embodiment 26, wherein the monofunctional polyether contains 50.5-99.5% by weight polymerized propylene oxide units and correspondingly 49.5-0.5% by weight polymerized ethylene oxide units.

28. The stabilizer of embodiment 27, wherein the monofunctional polyether contains 85-99.5% by weight polymerized propylene oxide units and correspondingly 15-0.5% by weight polymerized ethylene oxide units.

29. The stabilizer of embodiment 26, 27 or 28, wherein the monofunctional polyether is a polyether monol.

30. The stabilizer of any of embodiments 25-28, wherein the functionalized linear or branched polyether compounds containing at least one polyether segment that has a molecular weight of 700 to 8000 have structures represented by

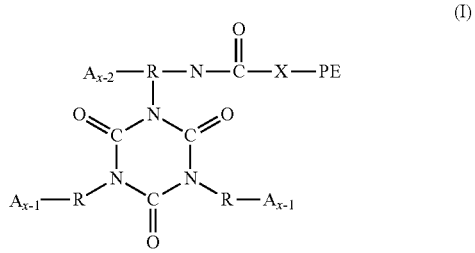

where each R represents the residue, after removal of isocyanate groups, from a starting polyisocyanate compound having the structure R—(NCO)$_x$; each x is a number from 2 to 6 representing the number of isocyanate groups on the starting polyisocyanate compound, PE represents a polyether chain of 700 to 8000 molecular weight, each X independently is —O— or —NH—, and each A is independently

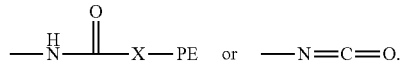

31. The stabilizer of any of embodiments 25-30 which contains 1 to 35% by weight isocyanate groups.

32. The stabilizer of embodiment 31 which contains 3 to 15% by weight isocyanate groups.

33. The stabilizer of any of embodiments 25-30, which contains said isocyanate-reactive groups and the isocyanate-reactive groups are hydroxyl groups.

34. A process for preparing a stabilizer, comprising reacting a starting polyisocyanate compound having 2 to 6 isocyanate groups per molecule and an isocyanate equivalent weight of up to 250 with a monofunctional polyether having a molecular weight of 700 to 3000 at a weight ratio of 10:90 to 90:10 in the presence of an isocyanate trimerization catalyst to form a product mixture containing one or more isocyanurate compounds containing at least one polyether segment having a molecular weight of 700 to 3000 and having an isocyanate content of at least 1% by weight.

35. The process of embodiment 34, wherein the monofunctional polyether contains 50.5-99.5% by weight polymerized propylene oxide units and correspondingly 49.5-0.5% by weight polymerized ethylene oxide units.

36. The process of embodiment 35, wherein the monofunctional polyether contains 85-99.5% by weight polymerized propylene oxide units and correspondingly 15-0.5% by weight polymerized ethylene oxide units.

37. The process of embodiments 34, 35 or 36, wherein the monofunctional polyether is a polyether monol.

38. A stabilizer formed by the process of any of embodiments 34-37.

39. A process for preparing a dispersion of polyisocyanate polyaddition particles in a base polyol, comprising forming an agitated mixture of a low equivalent weight polyol having a hydroxyl equivalent weight of up to 80 and 2 to 6 hydroxyl groups per molecule, one or more polyisocyanate compounds, the stabilizer of any of embodiments 25-33 or 38, and a base polyether polyol having a hydroxyl equivalent weight of at least 200, and reacting the low equivalent weight polyol with the polyisocyanate compound(s) in the presence of the base polyether polyol, the stabilizer, 0 to 2.0% by weight water based on the combined weight of the water, base polyol, low equivalent weight polyol, stabilizer and polyisocyanate compound(s), to form the dispersion of polyisocyanate polyaddition particles in the base polyol.

40. A dispersion of polyisocyanate polyaddition particles in a base polyether polyol made in accordance with the process of any of embodiments 1-24 or 39.

41. A polyurethane made by reacting the dispersion of embodiment 40 with a polyisocyanate.

42. The polyurethane of embodiment 41 which is a flexible polyurethane foam prepared in a slabstock process.

The following examples are provided to illustrate the invention, but are not intended to limit the scope thereof. All parts and percentages are by weight unless otherwise indicated.

Polyol I is a 3000 molecular weight, nominally trifunctional poly(propylene oxide) homopolymer, containing about 0.1% of water. At least 98% of its hydroxyl groups are secondary hydroxyl groups.

Polyol II is a 3500 molecular weight, nominally trifunctional random copolymer of propylene oxide and ethylene oxide, formed by polymerizing the monomers in the presence of a trifunctional initiator and potassium hydroxide catalyst. Polyol II contains about 0.1% of water. At least 95% of its hydroxyl groups are secondary hydroxyl groups and less than 5% are primary hydroxyl groups.

Polyol III is a 3500 molecular weight, nominally trifunctional random copolymer of propylene oxide and ethylene oxide, formed by polymerizing the monomers in the presence of a trifunctional initiator and a zinc hexacyanocobaltate catalyst complex. Less than 15% of its hydroxyl groups are primary hydroxyl groups at least 85% are secondary hydroxyl groups. Poly III contains about 0.1% of water.

Polyol IV is 2000 molecular weight poly(propylene oxide) diol containing about 0.1% of water. At least 98% of its hydroxyl groups are secondary hydroxyl groups.

Polyol V is 4500 molecular weight, poly(propylene oxide) triol having 18% by weight poly(ethylene oxide) endgroups. Its hydroxyl groups are mainly primary hydroxyl groups. Polyol V contains about 0.1% of water.

Monol X is a 1500 molecular weight, linear monofunctional block copolymer of 90% propylene oxide and 10% ethylene oxide, containing less than 0.2% of water and about 0.2% potassium acetate.

Monol Y is a 1500 molecular weight, linear monofunctional block copolymer of 90% propylene oxide and 10% ethylene oxide, containing less than 0.2% of water and free of potassium acetate.

Monol Z is a 750 molecular weight, linear monofunctional block copolymer of 50% propylene oxide and 50% ethylene oxide, containing about 0.2% of water.

80/20 TDI is a mixture of 80% 2,4-toluene diisocyanate and 20% 2,6-diisocyanate.

Seed PIPA A is a dispersion of 10% by weight PIPA particles in Polyol I.

Seed PIPA B is a dispersion of 10% by weight PIPA particles in Polyol V.

Comparative Samples A and B

Comparative Sample A: 5.63 parts of 80/20 TDI are blended into a mixture of 88 parts of Polyol I and 1.80 parts of Monol X on a high speed laboratory mixer. These materials and all other starting materials are at room temperature when added. The materials are mixed for 60 seconds, and then a mixture of 4.5 parts triethanolamine and 0.2 parts of a zinc carboxylate catalyst are added over sixty seconds with continued mixing. The reaction mixture is seen to whiten a few seconds after the triethanolamine addition is started. Mixing is continued another four minutes without further application of heat after the triethanolamine/catalyst addition is complete, during which time polyisocyanate polyaddition particles are seen to form. The product contains large particles with a significant fraction of particles larger than 50 μm, and is unstable overnight. This confirms that adding a monol to a polyol does not ensure particle stabilization, most likely due to the fact the majority of the monol does not become attached to the PIPA particles.

Comparative Sample B: A mixture of 4.6 parts triethanolamine and 0.2 parts of dibutyltindilaurate is blended into a mixture of 88 parts of Polyol I and 2 parts of Seed PIPA polyol B on a high speed laboratory mixer. These materials and all other starting materials are at room temperature when added. The materials are mixed for 60 seconds, and then 5.6 parts of 80/20 TDI are added over sixty seconds with continued mixing. The reaction mixture is seen to whiten a few seconds after the polyisocyanate addition is started. Mixing is continued another four minutes without further application of heat after the polyisocyanate addition is complete, during which time polyisocyanate polyaddition particles are seen to form and immediately flake out of solution. Particle size and viscosity cannot be measured. Similar results are obtained when the dibutyltindilaurate catalyst is replaced in turn with stannous octoate, dimethyltindineodecanoate, a bismuth carboxylate and zinc octoate. Comparative Example B shows the ineffectiveness of Seed PIPA polyol B, when used in conjunction with a base polyol containing mainly secondary hydroxyl groups, to stabilize PIPA particles.

EXAMPLES 1-3

Stabilizer A is made by combining 50 parts by weight of Monol X and 50 parts 80/20 TDI, and stirring the mixture at room temperature in a closed vessel. The theoretical isocyanate content (not considering biuret, urea, allophonate or isocyanurate formation) based on amounts of monol and 80/20 TDI is 23.6%. The measured isocyanate content of the product is 16%, which indicates that isocyanurate (and possibly biuret, urea and/or allophonate) formation has occurred due to the presence of potassium acetate.

Stabilizer B is made by combining 75 parts by weight of Monol X and 25 parts 80/20 TDI, and stirring the mixture in a closed vessel at room temperature. The theoretical isocyanate content (not considering biuret, urea, allophonate or isocyanurate formation) based on amounts of monol and 80/20 TDI is 11.2%. The measured isocyanate content of the product is 5.9%, which indicates that isocyanurate (and possibly biuret, urea and/or allophonate) formation has occurred due to the presence of potassium acetate.

Stabilizer C is made by combining 90 parts by weight of Monol X and 10 parts 80/20 TDI, and stirring the mixture in a closed vessel at room temperature. The theoretical isocyanate content (not considering biuret, urea, allophonate or isocyanurate formation) based on amounts of monol and 80/20 TDI is 3.7%. The measured isocyanate content of the product is 1.5%, which indicates that isocyanurate (and possibly biuret, urea and/or allophonate) formation has occurred due to the presence of potassium acetate.

EXAMPLE 1

5.4 parts of 80/20 TDI are mixed with 4.2 parts of Stabilizer C at room temperature. The resulting mixture is blended into 88 parts of Polyol I on a high speed laboratory mixer. A PIPA dispersion is then made by adding 4.5 parts of triethanolamine and 0.2 parts of zinc carboxylate catalyst and mixing for 5 minutes. After cooling to room temperature, a stable PIPA polyol is obtained. Particle size is measured using a Beckman Coulter LS Particle Size Analyzer. The viscosity of the dispersion is measured using a Bohlin rheometer with cone-and-plate geometry, operated in a rotational mode at 20° C. The viscosity is recorded at its equilibrium value. Results of the particle size and viscosity measurements are as reported in Table 1.

EXAMPLE 2

4.1 parts of 80/20 TDI are mixed with 4.2 parts of Stabilizer A. The resulting mixture is blended into 88 parts of Polyol I on a high speed laboratory mixer. A PIPA dispersion is then made in the general manner described for Example 1. Particle size and viscosity are measured as before and are as reported in Table 1.

EXAMPLE 3

5.2 parts of 80/20 TDI are mixed with 2.6 parts of Stabilizer B. The resulting mixture is blended into a mixture of 88 parts of Polyol I and 2 parts of Seed PIPA polyol A on a high speed laboratory mixer. A PIPA dispersion is then made in the manner described with respect to Example 1. Particle size and viscosity are measured and reported in Table 1.

The measured viscosity and particle size distribution for each of these experiments are as reported in Table 1.

TABLE 1

| Sample Designation | Viscosity, Pa · s | Particle Size |
| --- | --- | --- |
| Comparative A* | Unstable | Unstable overnight. |
| 1 | 1.025 | Multimodal with a main fraction having a broad distribution of particles from 1 to 30 µm (centered at about 5 µm and another large fraction from 30 to 200 µm. |
| 2 | 1.221 | Trimodal, with a fraction of particles from 0.05 to 1 µm, a main fraction from 1 to 5 µm, and a small shoulder centered at 10 µm. |
| 3 | 1.041 | Bimodal, with a largest fraction at 0.05 to 0.7 µm and a smaller but significant fraction at 0.7 to 4 µm. |

The results of Examples 1-3 show that Stabilizers A, B and C are effective in stabilizing the PIPA dispersion and getting small particles, when used by themselves or, in the case of Example 3, in conjunction with Seed PIPA Polyol A. The PIPA particles do not settle. The improvements in particle size and stability do not come at the expense of any significant increase in viscosity.

EXAMPLES 4 AND 5

Stabilizer D is made by combining 50 parts by weight of Monol X and 50 parts 80/20 TDI, and stirring the mixture at 50° C. in a closed vessel. The theoretical isocyanate content (not considering biuret, urea, allophonate or isocyanurate formation) based on amounts of monol and 80/20 TDI is 23.6%. The measured isocyanate content of the product is 13.7%, which as before indicates isocyanurate and possibly biuret, urea and/or allophonate formation.

Stabilizer E is made by combining 80 parts by weight of Monol X and 20 parts 80/20 TDI, and stirring the mixture in a closed vessel at 50° C. The theoretical isocyanate content (not considering biuret or isocyanurate formation) based on amounts of monol and 80/20 TDI is 7.6%. The measured isocyanate content of the product is 3.5%, which as before indicates isocyanurate and possibly biuret, urea and/or allophonate formation.

Examples 4 and 5 are made using Stabilizers D and E, respectively. To make Example 4, 4.3 parts of Stabilizer D is diluted with 4.3 parts 80/20 TDI. 88 parts of Polyol I are mixed with 4.5 parts of triethanolamine and 0.2 parts of the zinc carboxylate catalyst. The stabilizer/TDI mixture is then added to the polyol/triethanolamine/catalyst mixture and mixed for 5 minutes. After cooling to room temperature, a stable PIPA polyol is obtained.

To make Example 5, 2.4 parts of Stabilizer E are diluted with 5.4 parts of 80/20 TDI. This mixture is used to make a PIPA polyol as described with respect to Example 1.

In both cases, particle size and viscosity are measured as before. Results are as indicated in Table 2.

TABLE 2

| Sample Designation | Viscosity, Pa · s | Particle Size |
| --- | --- | --- |
| 4 | 1.30 | Bimodal, with a large fraction of particles having sizes from 0.05 to 0.7 µm, and another large fraction of particles having sizes from 0.7 to 4 µm. There is a very small fraction of particles of about 10 µm. |
| 5 | 2.40 | Bimodal, with a large fraction of particles having sizes from 0.05 to 0.8 µm (centered at about 0.15 µm, and another large fraction of particles having sizes from 0.8 to 6 µm. There is a small fraction of particles of about 10 µm. |

Both dispersions contain very small particles and are stable against particle settling. Viscosities are acceptable in each case. Both are considered very high quality dispersions and give good quality foams as reported later.

EXAMPLES 6-10

Stabilizers F, G, H and I are made by mixing Monol X with 80/20 TDI and allowing the mixture to react at 20° C. in a closed vessel. The ratios of starting materials, theoretical (not considering biuret, urea, allophonate and isocyanurate formation) and measured isocyanate contents and appearance are as indicated in Table 3.

TABLE 3

| Stabilizer | TDI/ Monol X Weight Ratio | Theoretical NCO content, wt.-% | Measured NCO content, wt.-% | Appearance |
| --- | --- | --- | --- | --- |
| F | 10/90 | 3.7 | 2.3 | Yellow liquid |
| G | 15/85 | 6.4 | 3.6 | Yellow liquid |
| H | 25/75 | 11.2 | 7.8 | Yellow liquid |
| I | 75/25 | 36.0 | 32.5 | Crystalline precipitate in yellow liquid phase |

Stabilizers F, G H and I are separately blended with 80/20 TDI and the resulting blends are used to make PIPA polyols Examples 6-10. The type and content of stabilizer in each PIPA polyol product is as indicated in Table 4.

TABLE 4

| Example | Stabilizer (Wt.-% in PIPA polyol product) |
|---|---|
| 6 | F (2.1) |
| 7 | H (2.6) |
| 8 | G (4.6) |
| 9 | H (6.1) |
| 10 | I (8.2) |

In each case, 88 parts of Polyol I are blended on a high speed laboratory mixer with the isocyanate/stabilizer mixture, followed by addition of 4.5 parts of triethanolamine and 0.2 parts of the zinc carboxylate catalyst to produce a PIPA polyol dispersion. Mixing is continued without additional applied heat for another 9 minutes after the final addition is completed in all cases except Example 7, in which the mixing is continued for 15 minutes. Particle size and viscosity are measured as before. Results are as indicated in Table 5.

TABLE 5

| Sample Designation | Viscosity, Pa · s | Particle Size |
|---|---|---|
| 6 | 1.04 | Monomodal, with particles mainly from 2 to 40 µm, and a small shoulder of particles up to 100 µm. The stability of this dispersion is marginal (but much better than Comparative Sample A). |
| 7 | 2.05 | Trimodal with a largest fraction between 1 and 6 µm and smaller fractions between 0.1 and 0.6 µm and 6-20 µm. The dispersion has good stability. |
| 8 | 1.26 | Trimodal with a largest fraction between 1 and 3 µm and smaller fractions between 0.1 and 1 µm and 3-20 µm. The dispersion has good stability. |
| 9 | 2.07 | Bimodal with a largest fraction between 0.05 and 1 µm centered on 0.3 µm. A smaller fraction has 1-10 µm particles, centered on 3 µm. Very good dispersion. |
| 10 | 1.28 | Polymodal with most particles 1-5 µm, but a significant fraction of 5-100 µm particles. |

These examples show the effect of varying the stabilizer composition, as well as the stabilizer content in the final PIPA polyol.

EXAMPLES 11-14

Stabilizer D is blended with 80/20 TDI at room temperature and used in different quantities to make PIPA polyol in Examples 11-14, as shown in Table 6:

TABLE 6

| Example No(s). | Stabilizer parts in PIPA polyol |
|---|---|
| 11 | 0.6 |
| 12 | 1.9 |
| 13 | 11.2 |
| 14 | 11.2 |

Examples 11 and 12 are made using the same general method described with respect to Example 4. Examples 13 and 14 made using the same general method as described with respect to Example 1.

The formulation, viscosity and particle size are indicated in Table 7.

TABLE 7

|  | Ex. 11 | Ex. 12 | Ex. 13 | Ex. 14 |
|---|---|---|---|---|
| Polyol A | 89.5 | 88.9 | 84.2 | 82.2 |
| Seed PIPA polyol B | 0 | 0 | 0 | 2 |
| Zinc carboxylate catalyst | 0.2 | 0.2 | 0.2 | 0.2 |
| TDI/Stabilizer mixture | 5.6 | 6.3 | 11.2 | 11.2 |
| Properties |  |  |  |  |
| Viscosity, Pa · s | 1.12 | 1.26 | 1.58 | 1.68 |
| Particle size, µm | 2-30 | 0.05-6 | 0.05-1 | 0.05-1 |

Example 11 shows that even a very small amount of the stabilizer of the invention containing high level of isocyanurate produces a product having better particle size and stability than Comparative Sample A. Increasing the amount of stabilizer gives better results, as shown in Examples 12 and 13. Adding a Seed PIPA Polyol B (Example 14) provides no additional benefit compared with Example 13.

EXAMPLES 15-18

Stabilizer J is made by mixing Monol X with 80/20 TDI at a 75/25 weight ratio at room temperature to produce a prepolymer having an isocyanate content of 6.3%. The theoretical NCO group content (not considering biuret, urea, allophonate and isocyanurate formation) is 11.2%, which indicates that isocyanurate (and possibly biuret, urea and/or allophonate) groups have been formed.

Example 15, 16 and 17 are made by mixing 2.6 parts of Stabilizer J with 5.2 parts of 80/20 TDI at room temperature. This isocyanate mixture is added at room temperature to 88 parts of Polyol I (Example 15), Polyol II (Example 16) and Polyol III (Example 17) on a high speed laboratory mixer and mixed for 60 seconds. Then a mixture of 4.5 parts of triethanolamine and 0.2 parts of a zinc carboxylate catalyst are added over sixty seconds with continued mixing. The reaction mixture is seen to whiten a few seconds after the triethanolamine addition is started. Mixing is continued another nine minutes without further application of heat after the triethanolamine/catalyst addition is complete. Particle size and viscosity are measured and data presented in Table 8.

Example 18 is made by blending 8.2 parts of Stabilizer J with 10 parts of TDI. This blend is added to a mixture of 71 parts of Polyol I and 4 parts of Example 3. 9 parts of triethanolamine and 0.2 parts of a zinc carboxylate catalyst are then added, and a dispersion is made as described with respect to Example 1. The final product (Example 18) is of good quality as reported in Table 8.

TABLE 8

| Designation | Base Polyol | Stabilizer J, weight percent in product | Ex. 3, parts | Viscosity, Pa · s | Particle Size, µm |
|---|---|---|---|---|---|
| 15 | I | 2.6 | 0 | 1.02 | 0.1-5 |
| 16 | II | 2.6 | 0 | 1.24 | 0.1-5 |
| 17 | III | 2.6 | 0 | 1.52 | 0.1-5 |
| 18 | I | 8.2 | 4 | 1.74 | 1-10 |

As can be seen from the data in Table 8, Stabilizer J effectively stabilizes PIPA particles in all three types of conventional polyols evaluated. At higher solids, good particle size distribution, viscosity and dispersion stability is obtained.

EXAMPLES 19 and 20

Stabilizer K is made by mixing Monol Y with 80/20 TDI at a 80/20 weight ratio at room temperature to produce a prepolymer having an isocyanate content of 7.3%. This is only slightly lower than the 7.6% theoretical isocyanate content (not considering biuret, urea, allophonate and isocyanurate formation), which indicates that few if any such groups have formed.

Stabilizer L is made in the same manner as Stabilizer K, except a quaternary ammonium trimerization catalyst is added. The prepolymer has an isocyanate content of 3.9% versus the theoretical amount of 7.6%, which indicates the formation of isocyanurate and possible biuret, urea and/or allophonate groups.

Examples 19 and 20 are made by mixing 2.4 parts of the stabilizer (Stabilizer K in the case of Example 19 and Stabilizer L in the case of Example 20) with 5.2 parts of 80/20 TDI at room temperature. This isocyanate mixture is added to a blend of 86 parts Polyol I and 2 parts of Example 3. 4.5 parts of triethanolamine mixed with 0.2 parts of the zinc carboxylate catalyst are added and the dispersion is mixed for additional 9 minutes.

Example 19 has particles in the size range of 3 to 25 μm and is more stable than any of Comparative Samples A-C. Example 20 has a low viscosity (0.98 Pa·s) and small particle size (0.05-2 μm), illustrating the advantage of incorporating isocyanurate linkages into the stabilizer.

EXAMPLES 21-23

Stabilizer M is made by reacting 80 parts of Monol Y with 20 parts 80/20 TDI in presence of 0.05 parts of a quaternary ammonium trimerization catalyst. Stabilizer M has an isocyanate content of 2.4% versus theoretical value of 7.6%, indicating isocyanurate and possibly biuret, urea and/or allophonate formation. The very low value relative to the theoretical value indicates that Stabilizer M contains a high proportion of isocyanurate rings relative to most of the other stabilizers.

PIPA polyols of Examples 21-23 are made using various amounts of Stabilizer M as indicated in Table 9. The stabilizer is mixed with 5.4 parts of 80/20 TDI and blended into a mixture of 86 parts Polyol I and 2 parts of Example 3. A mixture of 4.5 parts triethanolamine and 0.2 parts of the zinc carboxylate catalyst are added and a dispersion is made as before. The viscosity and particle size are as indicated in Table 9.

TABLE 9

| Example | Base Polyol | Stabilizer M, wt.-% in product | Solids, % | Viscosity, Pa · s | Particle Size, μm |
|---|---|---|---|---|---|
| 21 | I | 2.3 | 10% | 11.3 | 0.05-5 |
| 22 | I | 1.0 | 10% | 2.40 | 0.5-5 |
| 23 | I | 0.3 | 10% | 1.10 | 0.5-5 |

The data in Table 9 shows the effect of the level of a stabilizer having a low NCO content on final viscosity of PIPA product. Example 21 is thixotropic, as its viscosity drops from the value reported in Table 9 to a much lower value with increasing shear. The thixotropic behavior of Example 21 is believed to be due to either or both of the higher amounts of stabilizer M used to make the dispersion and the high proportion of isocyanurate groups in Stabilizer M. These factors may create a significant crosslinking effect with the base polyol during the formation of the dispersion. On another hand particle size and stability are good for all three examples over a period of several months.

EXAMPLES 24 and 25

Stabilizer N is prepared as follows. 80 parts of Monol Y and 20 parts of 80/20 TDI are reacted at room temperature in the presence of 0.05 parts of an N-hydroxyalkylquaternary ammonium carboxylate isocyanate trimerization catalyst. An exotherm is noticed and the reaction is allowed to proceed for a couple of hours, reaching an isocyanate content of about 3.5% versus theoretical 7.6% (as before, indicative of isocyanurate and possibly biuret, urea and/or allophonate formation). This mixture is then reacted with an excess of TEOA in order to cap all the residual isocyanate groups with the triethanolamine. The resulting capped material is designated Stabilizer N.

Example 24 is prepared by mixing 88 parts of Polyol IV with 4.34 parts of 80/20 TDI on a high speed laboratory mixer. A mixture of 3.54 parts triethanolamine, 0.2 parts of the zinc carboxylate catalyst and 1.93 parts of Stabilizer N is then added over sixty seconds with continued stirring. After the addition is completed, the mixture is stirred another 9 minutes. All components are at room temperature when added. The resulting PIPA polyol has a viscosity of 0.81 Pa·s. It has a bimodal particle size distribution with a larger fraction of particles having sizes from 0.1 to 0.9 μm and a slightly smaller fraction having particle sizes of 0.9 to 3 μm. This is considered to be a very good dispersion.

Example 25 is prepared by mixing 88 parts of Example 24 (prepared the same day) with 4.34 parts of 80/20 TDI on a high speed laboratory mixer. A mixture of 3.54 parts triethanolamine, 0.2 parts of the zinc carboxylate catalyst and 1.93 parts of Stabilizer N is then added over sixty seconds with continued stirring. After the addition is completed, the mixture is stirred another 9 minutes. The resulting PIPA polyol has a viscosity of 1.30 Pa·s at 20% solids by weight. It has a bimodal particle size distribution with a larger fraction of particles having sizes from 0.2 to 0.9 μm and a slightly smaller fraction having particle sizes of 0.9 to 7 μm. A small shoulder of larger particles is present. This is considered to be a very good dispersion, with low viscosity and small particles.

EXAMPLE 26

Stabilizer O is made by reacting 80 parts of Monol X with 20 parts of 80/20 TDI at room temperature in a closed vessel. Stabilizer O has an isocyanate content of 1.8% versus theoretical value of 7.6%, indicating isocyanurate and possibly biuret, urea and/or allophonate formation.

Example 26 is made using by blending 9.4 parts of triethanolamine and 0.2 parts of the zinc carboxylate catalyst into a mixture of 78 parts Polyol V and 2 parts of Seed PIPA Polyol B. 2.9 parts of stabilizer O mixed with 11.4 parts of 80/20 TDI are added, followed by additional 9 minutes of mixing. Particle size is 0.1-2 microns and viscosity is 3.0 Pa·s. The 20% solids product is stable.

Foaming Experiments

Box foams are made by hand mixing at room temperature all components listed in Table 10 below. The resulting reaction mixture is poured into an open box and allowed to expand and cure in the box. PIPA polyols from Examples 4, 5, 7, 9, 15, 16 and 17 are used to make foams 4-F, 5-F, 7-F, 9-F, 15-F, 16-F and 17-F, respectively. Foam density, compression force deflection (40%), resilience, airflow and compression set are measured according to ASTM test methods. Results are as indicated in Table 10.

TABLE 10

|  | Designation | | | | | | | | |
|---|---|---|---|---|---|---|---|---|---|
|  | Control A* | Control B* | 4-F | 5-F | 7-F | 9-F | 15-F | 16-F | 17-F |
| Ingredient | | | | | | | | | |
| Polyol I | 100 | 75 | 0 | 0 | 0 | 0 | 0 | 0 | 0 |
| SAN CPP[1] | 0 | 25 | 0 | 0 | 0 | 0 | 0 | 0 | 0 |
| PIPA Polyol | 0 | 0 | 100 | 100 | 100 | 100 | 100 | 100 | 100 |
| Amine Catalysts (Dabco 33 LV and Niax A1, 2:1 ratio) | 0.15 | 0.15 | 0.15 | 0.16 | 0.15 | 0.15 | 0.16 | 0.16 | 0.16 |
| Stannous Octoate | 0.15 | 0.15 | 0.1 | 0.1 | 0.15 | 0.15 | 0.1 | 0.1 | 0.1 |
| Water | 3.5 | 3.5 | 3.5 | 3.5 | 3.5 | 3.5 | 3.5 | 3.5 | 3.5 |
| 80/20 TDI (index) | 115 | 115 | 110 | 110 | 115 | 115 | 115 | 115 | 115 |
| Properties | | | | | | | | | |
| Density, kg/m$^3$ | 29.3 | 29.5 | 28.7 | 28.3 | 28.2 | 27.1 | 26.6 | 27.2 | 26.9 |
| CFD, 40%, kPa | 3.9 | 5.1 | 4.8 | 4.8 | 5.2 | 5.6 | 4.5 | 4.6 | 5.1 |
| Resilience, % | 39 | 32 | 37 | 35 | 33 | 38 | 33 | 30 | 30 |
| Airflow, L/m (scfm) | 109 (3.8) | 91 (3.2) | 126 (4.4) | 123 (4.3) | 154 (5.4) | 37 (1.3) | 143 (5.0) | 114 (4.0) | 97 (3.4) |
| 75% Comp. Set, % | 5.7 | 9.2 | 6.4 | 5.6 | 5.1 | 10.6 | 5.3 | 4.9 | 6.4 |

*Not an example of the invention.
[1]A copolymer polyol containing dispersed styrene-acrylonitrile particles.

The data in Table 10 shows that PIPA polyols of the invention can be used to make polyurethane foam having properties equivalent or better than foam made using a conventional, unfilled polyol (Control A) or a conventional polymer polyol which has dispersed styrene-acrylonitrile particles (Control B).

Comparative Sample C

Comparative Stabilizer P is made by reacting with 70 parts of Monol Z with 30 parts of 80/20 TDI at room temperature in a closed vessel. The NCO content is 25% versus theoretical 31.1%. The difference is believed to be due to biuret, urea and/or allophonate formation caused by the presence of water in hydrophilic Monol Z.

Example C is made by mixing 3.9 parts of 80/20 TDI with 2.9 parts of Comparative Stabilizer P at room temperature and adding the mixture to 89 parts of Polyol I. Subsequently, 4.4 parts of triethanolamine mixed with 0.2 parts of zinc carboxylate catalyst are added and the resulting mixture stirred for an additional 9 minutes. A gel forms immediately. Comparative Sample C demonstrates the inability of a stabilizer compound which contains polyether chains having a high proportion of polymerized ethylene oxide to form a stable dispersion.

What is claimed is:

1. A process for preparing a dispersion of polyisocyanate polyaddition particles in a base polyol, comprising forming an agitated mixture of a low equivalent weight polyol having a hydroxyl equivalent weight of up to 80, one or more polyisocyanate compounds, a stabilizer, a base polyether polyol having a hydroxyl equivalent weight of at least 200, and reacting the low equivalent weight polyol with the polyisocyanate compound(s) in the presence of the base polyether polyol and the stabilizer, to form the dispersion of polyisocyanate polyaddition particles in the base polyol, wherein the stabilizer includes one or more functionalized linear or branched polyether compounds having at least one polyether segment that have a molecular weight of 200 to 8000, wherein the functionalized linear or branched polyether compounds are terminated at one end with one or more isocyanate groups or with one or more isocyanate-reactive groups linked to the polyether through one or more urea and/or urethane groups, and further wherein all or a portion of such functionalized linear or branched polyether compounds contain one or more biuret, isocyanurate, urea or allophonate groups.

2. The process of claim 1 wherein the functionalized linear or branched polyether compound(s) are a reaction product of a monofunctional polyether having a molecular weight of 700 to 8000 and a polyisocyanate having an isocyanate equivalent weight of up to 300.

3. The process of claim 2, wherein all or a portion of the functionalized linear or branched polyether compound(s) contain one or more isocyanurate groups.

4. The process of claim 1, wherein the functionalized linear or branched polyether compound(s) containing one or more isocyanurate groups have a structure represented by

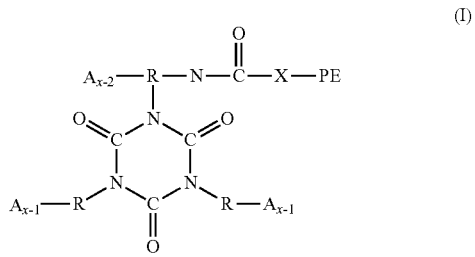

(I)

where each R represents the residue, after removal of isocyanate groups, from a starting polyisocyanate compound having the structure R—(NCO)$_x$; each x is a number from 2 to 6 representing the number of isocyanate groups on the starting polyisocyanate compound, PE represents a polyether chain of 700 to 8000 molecular weight, each X independently is —O— or —NH—, and each A is independently

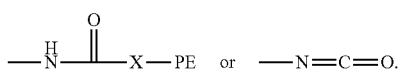

5. The process of claim 1 wherein the stabilizer contains 3 to 15% by weight isocyanate groups.

6. The process of claim 1 wherein 92 to 100% of the hydroxyl groups of the base polyol are secondary hydroxyl groups.

7. The process of claim 1 wherein the aminoalcohol is triethanolamine or a mixture of 75-99.9 weight-% triethanolamine and 0.1 to 25 weight-% of another low equivalent weight polyol.

* * * * *